(12) United States Patent
Murata

(10) Patent No.: US 6,559,210 B2
(45) Date of Patent: May 6, 2003

(54) CHARGING MEMBER AND ELECTROPHOTOGRAPHIC APPARATUS

(75) Inventor: Jun Murata, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 09/790,867

(22) Filed: Feb. 23, 2001

(65) Prior Publication Data

US 2001/0021736 A1 Sep. 13, 2001

(30) Foreign Application Priority Data

Feb. 28, 2000 (JP) ........................................ 2000-051580

(51) Int. Cl.⁷ .............................. C08K 3/20; H05F 3/00

(52) U.S. Cl. ........................ 524/251; 399/176; 399/313; 361/225; 492/56

(58) Field of Search ........................ 524/251; 399/176, 399/313; 361/225; 492/56

(56) References Cited

U.S. PATENT DOCUMENTS 5,819,142 A    10/1998    Murata et al. .............. 399/176

FOREIGN PATENT DOCUMENTS

| JP | 8-159148 | 6/1996 |
|---|---|---|
| JP | 9-34215 | 2/1997 |
| JP | 10-87897 | 4/1998 |

*Primary Examiner*—Kriellion A. Sanders
(74) *Attorney, Agent, or Firm*—Fitzpatrick, Cella, Harper & Scinto

(57) ABSTRACT

A charging member is provided, in which the electrical resistance is controlled with ease, the electrical resistances are uniform, and the electrical resistance, chemical properties, mechanical properties, etc., are suppressed to change with time so as to exhibit superior durability. The charging member primarily contains 100 parts by weight of at least one kind of polar rubber including at least a nitrile rubber, and further contains at least 0.01 parts by weight or more and 5 parts by weight or less of diazabicycloamine compound and 0.01 parts by weight or more and 10 parts by weight or less of weakly acidic compound.

9 Claims, 2 Drawing Sheets

CHARGING MEMBER AND ELECTROPHOTOGRAPHIC APPARATUS

BACKGROUND OF THE INVENTION

1. Field of the Invention

The present invention relates to a charging member preferably used as a charging device, etc., mounted on an electrophotographic apparatus. In particular, the present invention relates to a charging member preferably used as, for example, a transfer roller for charging transfer materials and a charging roller for charging photosensitive members.

2. Description of the Related Art

Charging members such as transfer rollers for charging transfer materials and charging rollers for charging photosensitive members are mounted on electrophotographic apparatuses such as copying machines and optical printers.

For example, when a toner image developed and formed on an image-holding member, e.g., a photosensitive member, an intermediate transfer member, a transfer drum, is transferred on a transfer material, e.g., paper, the transfer material is press-contacted to the image-holding member using the transfer roller, and at the same time, the transfer material is electrified by being supplied a charge with the polarity opposite to that of a toner so that the toner is adsorbed on the transfer material and the toner image is transferred.

Herein, the density of the charge being supplied to the transfer material affects the quality of the resulting image to a great degree. That is, when the charge density is insufficient, since the force for adsorbing the toner is decreased, particularly in the case in which the transfer material is a dry paper, a problem of so-called "splashing" may be occurred. On the other hand, when the charge density is in an excessive degree, the blurring may be occurred due to the toner being electrified to have the opposite polarity so that a high quality of image may not be produced. Therefore, in order to realize good control of the charge density, a charging material used as the transfer roller, etc., is required, for example, to have an electrical resistance with ease in control, and furthermore, with no large fluctuation for a long time.

In addition, the uniformity of the charge density affects the quality of the resulting image to a great degree. That is, when the charge density is not uniform, unevenness in concentration in transfer of a solid black image and fleck-like unevenness so-called "sand-like area" in the transferred image may be occurred. Therefore, in order to realize high uniformity in the charge density, the charging member used as the transfer roller, etc., is required, for example, to have small variations in electrical resistances according to positions.

As another example of the charging member, the charging roller can be mentioned. That is, in the electrophotographic apparatus, in order to suppress unevenness in the image concentration, and to suppress separation and retransfer, the photosensitive member is required to be uniformly electrified before an electrical latent image is formed on the photosensitive member. Hitherto, a corona charging device has been used for charging the photosensitive member. In the case in which the corona charging device is used, there have been, however, problems in that ozone is generated, a pinhole may be generated in the surface layer of the photosensitive member due to an abnormal discharge, etc. On the other hand, in the case in which the charging roller is used for charging the photosensitive member, since no discharge is occurred, and the charging is performed while the charging roller, the predetermined voltage being applied thereto, is closed to or contacted with the photosensitive member, the aforementioned problems are suppressed.

The charging member used as the aforementioned charging roller, etc., may be filled with, for example, carbon black, graphite, metallic oxides such as titanium oxide and tin oxide, metallic powders such as copper and silver, and particles with conductive coatings, so that the electrical resistance is controlled to be a predetermined value. In order to suppress unevenness in electrification, destruction of the photosensitive member due to a partial leakage, etc., it is required that the electrical resistance of used charging member is controlled with ease and local variations in electrical resistances are suppressed.

In order to realize the aforementioned properties required of the charging member, various suggestions have been made until now.

For example, it is disclosed in Japanese Patent Laid-Open No. 8-159148 that the variations in volume resistivity of the roll are suppressed by the rubber roll including the first layer made of a polar rubber and the second layer made of a synthetic resin covering around the perimeter of the first layer so as to realize uniformity in the image property. Even when the resin layer is formed on the polar rubber layer as disclosed in the aforementioned specifications, it is, however, believed that the effect of the second layer made of the synthetic resin being provided may be insufficient as long as the volume resistivity of the polar rubber layer itself is not improved in uniformity and durability.

It is disclosed in Japanese Patent Laid-Open No. 10-87897 that the hardness and the electrical resistance are controlled in the predetermined range so as to realize uniformity in the conductivity by a rubber composition containing the vulcanized product of the rubber component A, the rubber component B vulcanized in a mechanism different from that in the rubber component A, the conductive particle, and at least one antioxidant selected from the group consisting of hydroquinone derivatives and phenol derivatives. In the aforementioned specifications, it is described that desired electrical resistance and uniformity in the conductivity are realized by the addition of the predetermined antioxidant, it is, however, not described in details regarding the promotion of the vulcanization reaction, etc.

It is described in Japanese Patent Laid-Open No. 9-34215 that diazabicycloamine is used in the manufacture of the charging member using a urethane rubber. Since diazabicycloamine, however, abruptly reacts with urethane as temperature is elevated, unevenness in the cross-linking reaction is likely to be occurred. Therefore, particularly in the case in which molding is performed in a mold, unevenness in the cross-link is occurred due to temperature variations in the mold so that there are problems in that unevenness in the hardness and unevenness in the resistance in the molded material are likely to be occurred.

SUMMARY OF THE INVENTION

In consideration of the aforementioned circumstances, objects of the present invention are to provide a charging member in which the electrical resistance is controlled with ease, the electrical resistance is uniform, and the electrical resistance, chemical properties, mechanical properties, etc., are suppressed to vary with time so as to exhibit excellent durability, and to further provide an electrophotographic apparatus exhibiting superior performances provided with a charging device produced using the aforementioned charging member._

The present invention was made to achieve the aforementioned objects. According to the present invention, a charging member primarily containing 100 parts by weight of at least one kind of polar rubber including at least a nitrile rubber, further containing at least 0.01 parts by weight or more and 5 parts by weight or less of diazabicycloamine compound and 0.01 parts by weight or more and 10 parts by weight or less of weakly acidic compound is provided. That is, according to the present invention, the charging member having superior properties in, for example, permanent compression set and abrasion resistance by the nitrile rubber being vulcanized using diazabicycloamine as a vulcanization accelerator.

Furthermore, the resistance can be controlled with ease according to the additive amount thereof, and the charging member in which the resistance variations due to humidity are also suppressed can be produced.

A hydrin rubber has good reactivity similar to that of the nitrile rubber and has effects not only on the permanent compression set, but also on the resistance variations due to endurance. In the case in which those are used as a mixture, co-vulcanization proceeds in spite of difference in reactivity between those so that the charging member having combined superior properties with no degradation in each property can be produced.

The reasons such a superior charging member can be produced are believed that the diazabicycloamine compound has a function of accelerating vulcanization not abruptly being increased with elevation in temperature, and furthermore, the nitrile rubber and the diazabicycloamine compound are superior in dispersiveness and reactivity therebetween.

Further objects, features and advantages of the present invention will become apparent from the following description of the preferred embodiments with reference to the attached drawings.

DESCRIPTION OF THE PREFERRED EMBODIMENTS

Figure 1:
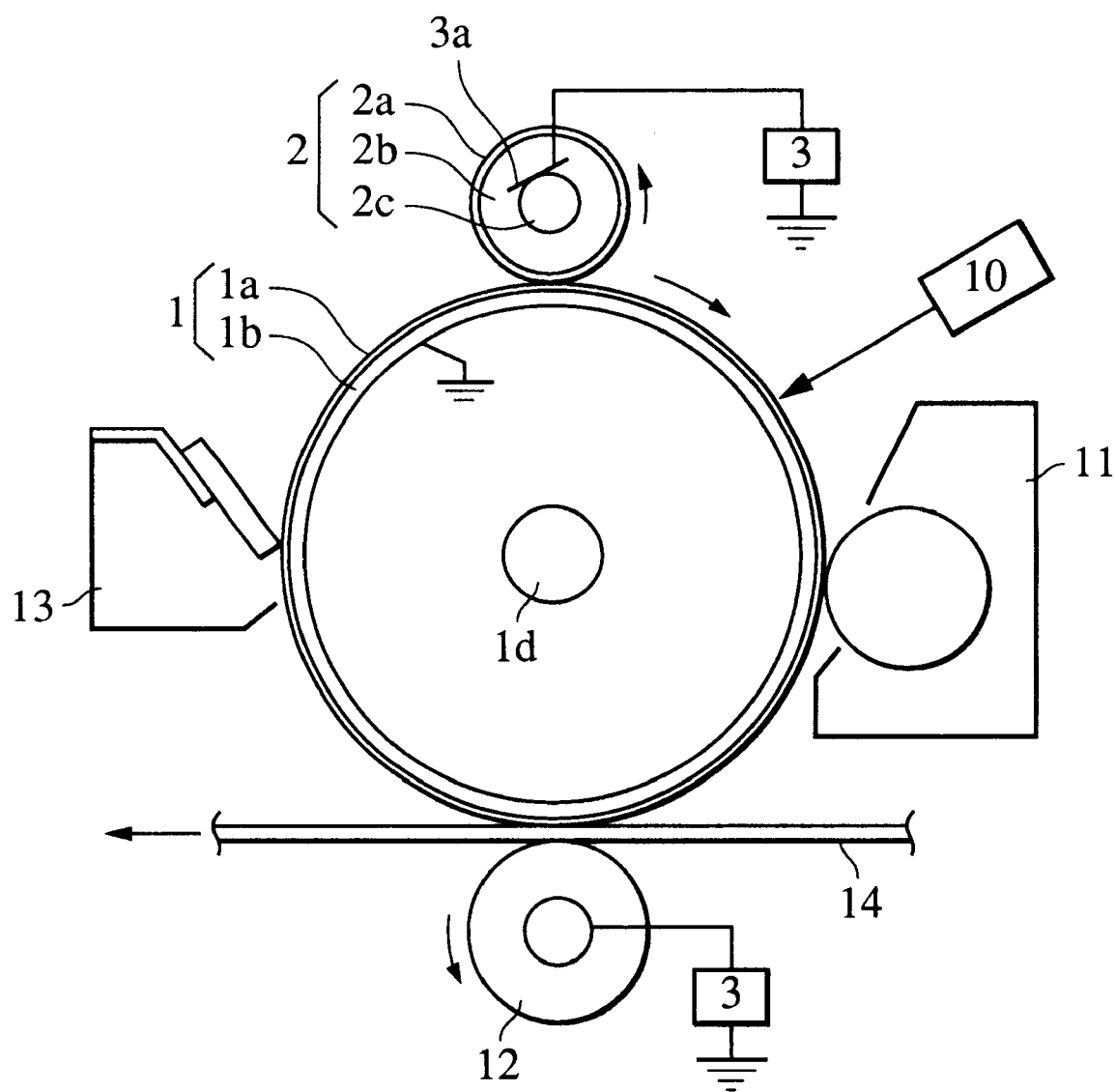
FIG. 1 is a schematic constitutional view of an electrophotographic apparatus using a charging member according to the present invention.
Figure 2:
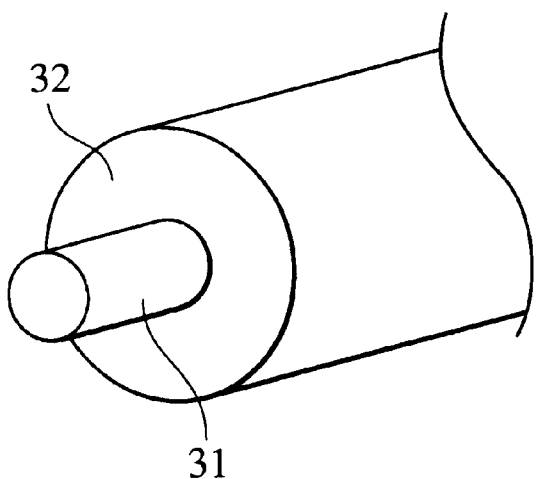
FIG. 2 is a schematic constitutional view of a transfer roller using a charging member according to the present invention.

In the charging member according to the present invention, at least one kind of polar rubber including at least a nitrile rubber is used. That is, if necessary, the electrical resistance is controlled by mixing and vulcanizing at least two kinds of polar rubbers. In some cases, in general, since each polar rubber has different reactivity in the vulcanization reaction, cross-linkages may be insufficient due to polar rubbers having low reactivity in the vulcanization reaction, and cross-linkage may be hardly formed between rubbers having different polarities. Herein, the addition of the diazabicycloamine compound and a predetermined amount of weakly acidic compound is effective to realize a desired electrical resistance and to prevent local variations in electrical resistances from being occurred.

That is, in the case in which the diazabicycloamine compound and the weakly acidic compound are combined, the effect of accelerating vulcanization is particularly remarkable, and even in the case in which polar rubbers having a small number of unsaturated bonds between carbons such as an epichlorohydrin rubber or polar rubbers having no unsaturated bond between carbons are used, cross-linkages are believed to be sufficiently formed according to the present invention. Furthermore, it is believed that cross-linkages between rubbers having different polarities are sufficiently formed according to the present invention, although co-vulcanization of those rubbers has been hitherto believed to be difficult.

As a consequence, in the charging member according to the present invention, it is believed that a desired electrical resistance can be realized with ease, local variations in electrical resistances are prevented from being occurred, and the electrical resistance, chemical properties, mechanical properties, etc., are suppressed to vary with time so as to realize excellent durability.

As the diazabicycloamine compound used in the present invention, for example, 1,8-diazabicyclo[5.4.0]-7-undecene (hereafter abbreviated as DBU), 1,5-diazabicyclo[4.3.0]-5-nonene (hereafter abbreviated as DBN), and 1,4-diazabicyclo[2.2.2]-octane (hereafter abbreviated as DABCO) can be mentioned, although not specifically limited as long as the compound accelerates vulcanization reaction of at least one kind of polar rubber by being used together with weakly acidic compounds. Among these diazabicycloamine compounds, in particular, DBU having an effect of accelerating vulcanization reaction to a great degree is preferable.

The content of the diazabicycloamine compound relative to 100 parts by weight of the polar rubber (in the case in which at least two kinds of polar rubbers are used, relative to 100 parts by weight of the total amounts of the polar rubbers) is specified to be 0.01 parts by weight or more, preferably be 0.05 parts by weight or more, and more preferably be 0.1 parts by weight or more, and be 5 parts by weight or less, preferably be 4 parts by weight or less, and more preferably be 3 parts by weight or less from the viewpoint of the balance of properties of the produced charging member.

As the weakly acidic compound used in the present invention, for example, phenol resins, phenol resin derivatives, bisphenol derivatives, poly bisphenol derivatives, phenolic compounds, oleic acid, octylic acid, and phthalic acid are mentioned, although not specifically limited as long as the compound accelerates vulcanization reaction of at least one kind of polar rubber by being used together with diazabicycloamine compounds. Among these weakly acidic compounds, phenol resins are preferable from the viewpoint of low possibility of pollution, heat resistance, durability, etc.

As the phenol resin used in the present invention, novolac type phenol resins, resol type phenol resins, or mixtures thereof are used as necessary, and the weight average molecular weights are specified to be in the range of 200 or more and 5,000 or less as necessary. The average introduction rate of hydroxymethyl groups into the phenol ring at the terminal, other than the terminal, or the terminal and other than the terminal of used phenol resin are specified to be in the range of 0.01 or more and 4 or less as necessary.

The content of the weakly acidic compound relative to 100 parts by weight of the polar rubber (in the case in which at least two kinds of polar rubbers are used, relative to 100 parts by weight of the total amounts of the polar rubbers) is specified to be 0.01 parts by weight or more, preferably be 0.05 parts by weight or more, and more preferably be 0.1 parts by weight or more, and be 10 parts by weight or less, preferably be 8 parts by weight or less, and more preferably be 6 parts by weight or less from the viewpoint of the balance of properties of the produced charging member.

The polar rubber used together with the nitrile rubber in the present invention is the rubber having a large dipole moment of group in the molecule and having a high dielectric constant. Specifically, an epichlorohydrin rubber (CHR), an epichlorohydrin-ethylene oxide rubber (CHC), an epichlorohydrin-propylene oxide rubber, etc., are suitable for the aforementioned polar rubber.

In the production of the charging member according to the present invention, in order to realize the desired electrical resistance, at least two kinds of polar rubbers having different speeds of vulcanization selected from the polar rubbers described above as examples may be concurrently used.

The content of the polar rubber in the charging member is preferably 50% by weight or more and 99.99% by weight or less. In particular, in the case in which at least two kinds of polar rubbers are used, the total amount thereof is preferably in the aforementioned range.

In the case in which the charging member according to the present invention is used for a charging device continuously energized for a long time, etc., in particular, when fluctuations in the electrical resistance and change in properties of the charging member are required to be suppressed so as to realize an increase in durability and an increase in life, a bisphenol-based rubber antioxidant is preferably added. The bisphenol-based rubber antioxidant exhibiting excellent resistance to oxidation, being stable against organic photosensitive members, and causing no pollution is especially preferably used in the charging member according to the present invention.

As the aforementioned bisphenol-based rubber antioxidant, for example, 2,2'-methylenebis(4-methyl-6-tert-butylphenol) (hereafter abbreviated as MMBP), 2,2'-methylenebis(4-ethyl-6-tert-butylphenol) (hereafter abbreviated as MEBP), 4,4'-butylidenbis(6-tert-butyl-3-methylphenol) (hereafter abbreviated as BBMP), 4,4'-thiobis(6-tert-butyl-3-methylphenol) (hereafter abbreviated as TBMP), and 1,1'-bis(4-hydroxyphenyl)-cyclohexane (hereafter abbreviated as BHOPC) are mentioned.

The content of the bisphenol-based rubber antioxidant relative to 100 parts by weight of the polar rubber (in the case in which at least two kinds of polar rubbers are used, relative to 100 parts by weight of the total amounts of the polar rubbers) is preferably 0.01 parts by weight or more, more preferably is 0.05 parts by weight or more, and further preferably is 0.1 parts by weight or more, and is preferably 5 parts by weight or less, more preferably is 4 parts by weight or less, and further preferably is 3 parts by weight or less from the viewpoint of the balance of properties of the produced charging member.

In the production of the charging member according to the present invention, in order to realize the desired electrical resistance, and to improve the mechanical properties, processability, and non-adhesiveness of the produced charging member, nonpolar rubbers may be concurrently used.

The nonpolar rubber is the rubber having no large dipole moment of group in the molecule and having a low dielectric constant. Specifically, an isoprene rubber (IR), a butadiene rubber (BR), a styrene-butadiene rubber (SBR), an ethylene-propylene rubber (EPM), an ethylene-propylenediene rubber (EPDM), a butyl rubber (IIR), an olefin elastomer, an SEBS elastomer, a polystyrene elastomer, etc., are mentioned as the nonpolar rubber.

In the case in which weatherability, for example, ozone resistance, is required, EDPM is suitable because of high weatherability. In sulfur vulcanization, the iodine number of used EPDM is preferably 20 or more, and more preferably is 30 or more, from the viewpoint of the co-vulcanization.

The content of the nonpolar rubber relative to 100 parts by weight of the polar rubber (in the case in which at least two kinds of polar rubbers are used, relative to 100 parts by weight of the total amounts of the polar rubbers) is preferably 1 parts by weight or more, more preferably is 5 parts by weight or more, and further preferably is 10 parts by weight or more, and is preferably 100 parts by weight or less, more preferably is 80 parts by weight or less, and further preferably is 50 parts by weight or less from the viewpoint of the balance of properties of the produced charging member.

If necessary, at least two kinds of nonpolar rubbers selected from the nonpolar rubbers described above as examples may be concurrently used. In this case, the total amount of at least two kinds of nonpolar rubbers is preferably in the aforementioned range.

As the vulcanizing agent used in the present invention, for example, sulfur, sulfur donors, and organic peroxides, can be mentioned. As the sulfur donor, for example, thiurams such as tetramethylthiuram disulfide and tetrabutylthiuram disulfide, and thiocarbonates such as 6-methylquinoxaline-2,3-dithiocarbonate, can be mentioned. As the organic peroxide, for example, dicumyl peroxide, di-t-butyl peroxide, p-menthane hydroperoxide, and cumene hydroperoxide, can be mentioned. At least two kinds of vulcanizing agents selected from the vulcanizing agents described above as examples may be concurrently used.

The proportion of the vulcanizing agent relative to 100 parts by weight of the polar rubber (in the case in which at least two kinds of polar rubbers are used, relative to 100 parts by weight of the total amounts of the polar rubbers) is preferably 0.01 parts by weight or more and 10 parts by weight or less. In particular, in the case in which at least two kinds of vulcanizing agents are used, the total amount thereof is preferably in the aforementioned range.

As the vulcanization accelerator used in the present invention, for example, guanidines such as 1,3-diphenylguanidine, thioureas such as N,N'-diphenylthiourea, benzothiazoles such as dibenzothiazyl disulfide (DM) and mercaptobenzothiazole (M), thiurams such as dipentamethylenethiuram tetrasulfide (TRA) and tetraethylthiuram disulfide (TET), and thiocarbamic acids such as pentamethylenedithiocarbamic acid piperidine salts, are mentioned. At least two kinds of vulcanization accelerators selected from the vulcanization accelerators described above as examples may be concurrently used.

The proportion of the vulcanization accelerator relative to 100 parts by weight of the polar rubber (in the case in which at least two kinds of polar rubbers are used, relative to 100 parts by weight of the total amounts of the polar rubbers) is preferably 0.01 parts by weight or more and 10 parts by weight or less. In particular, in the case in which at least two kinds of vulcanization accelerators are used, the total amount thereof is preferably in the aforementioned range.

In the charging member according to the present invention, carbon black, metallic oxides, for example, $TiO_2$, $SnO_2$, and ZnO, oxides, for example, a solid solution of $SnO_2$ and $Sb_2O_5$, a solid solution of ZnO and $Al_2O_3$, and a solid solution of $In_2O_3$ and $SnO_2$, metallic powder, for example, Cu and Ag, and conductive powders, the surface thereof being coated with those metals, etc., may be added as necessary so as to control the electrical resistance of the charging member at the desired value.

Furthermore, stearic acids, inorganic fillers, for example, calcium carbonate, hydrotalcite, silica, talc, and mica, mold release improving agent, for example, silicone particles and fluoroplastic particles, etc., may be added as necessary so as to control mechanical properties of the charging member.

The charging member of the present invention is produced by primarily at least one kind of polar rubber being cross-linked by the vulcanization reaction in the presence of at least 0.01 parts by weight or more and 5 parts by weight or less of diazabicycloamine compound and 0.01 parts by weight or more and 10 parts by weight or less of weakly acidic compound relative to 100 parts by weight of the aforementioned at least one kind of polar rubber.

That is, in the present invention, predetermined amounts of the aforementioned polar rubber, nonpolar rubber, bisphenol-based rubber antioxidant, carbon black, metallic oxide, oxide, metallic powder, conductive particle, inorganic filler, mold release improving agent, etc., are mixed, and predetermined amounts of the diazabicycloamine compound, for example, DBU, the weakly acidic compound, for example, phenol resin, etc., in addition to the vulcanizing agent and the vulcanization accelerator are added and mixed.

The aforementioned compounds are mixed at a time, or several as necessary.

The resulting mixture is molded into the predetermined shape by extrusion, etc., and thereafter, is subjected to at least one time of vulcanization reaction so as to produce the charging member of the present invention.

In order to improve pollution resistance, to control surface roughness and surface friction coefficient, etc., to improve mold release properties of members being electrified, and to improve efficiencies of removing particles such as toners and a powder of paper adhered on the surface, the surface of the charging member of the present invention may be reformed by, for example, surface treatments with coupling agents, reactive fluorine-based surfactants, etc., surface cleanings with chlorine-based solvents such as dilute hydrochloric acid, etc., and ultraviolet (UV) irradiation treatments.

Among the aforementioned methods for surface reformation, the UV irradiation treatment is preferable because of ease in treatment, high efficiency, less effect on other properties, etc. For example, in the case in which the charging member is in the shape of a roller, the entire surface can be uniformly treated by the irradiation of, e.g., UV with primary wavelengths of 185 nm and 245 nm at 40 mW/cm$^2$ for 4 minutes, while the roller is rotated.

The charging member of the present invention may be provided with appropriate functional layers as necessary.

As explained above, since in the charging member of the present invention, high controllability and uniformity in the electrical resistance is realized and the electrical resistance, chemical properties, and mechanical properties are suppressed to change with time so as to realize excellent durability, charging members having excellent properties can be manufactured using the charging member according to the present invention. These charging members are preferably used in electrophotographic apparatuses such as copying machines and optical printers.

As examples of these charging members, transfer rollers, charging rollers, etc., are mentioned. In the uses thereof, the electrical resistances of the charging members are preferably $1 \times 10^5$ Ω or more and $1 \times 10^{12}$ Ω or less from the viewpoint of sufficient application of the bias voltage to the member being electrified.

The charging member of the present invention can be used in appropriate forms of solid, sponge, etc. In order to form a sufficient width of nip with a member being electrified and to realize uniform electrification, in particular, in order to suppress the defect so-called "blank areas" in which the middle part of the line image is not transferred, the charging member of the present invention preferably has a relatively low hardness. Specifically, the Asker C hardness thereof is preferably 20° or more and 80° or less.

FIG. 1 shows a schematic constitution of an example of an electrophotographic apparatus provided with a charging device manufactured using a charging member according to the present invention. Reference numeral 1 designates an image-holding member being electrified which is herein a drum type electrographic photosensitive member having basic constitutional layers of a conductive substrate layer 1b made of Al, etc., and a photosensitive layer 1a formed around the perimeter thereof. This electrographic photosensitive member is rotated about a supporting axis 1d in a clockwise direction as shown in the drawing at a predetermined peripheral velocity.

Reference numeral 2 designates a charging roller contacted with the photosensitive layer 1a for uniformly and primarily charging the photosensitive member surface so that the photosensitive member has predetermined polarity and voltage. The charging roller is an example of the charging device manufactured using the charging member according to the present invention. The charging roller 2 is composed of a central core metal 2c, a lower layer of conductive elastic layer 2b formed around the perimeter thereof and an upper layer of resistive layer 2a further formed around the perimeter thereof, and is rotated depending on the rotation of the photosensitive member 1 by the both ends of the core metal 2c being pressed with pressing devices, although not shown in the drawing. The resistive layer 2a and the conductive elastic layer 2b are formed of the charging member according to the present invention.

As shown in FIG. 1, a predetermined direct current (DC) bias or a direct current plus alternating current (AC+DC) bias is applied to the core metal 2c from a power supply 3 via a sliding contact 3a so that the photosensitive layer 1a is contact-charged so as to have predetermined polarity and voltage. Thereafter, an electrostatic latent image is formed by an exposure, for example, laser beam scanning exposure and slit exposure of original document image, with exposure device 10 on the photosensitive layer 1a uniformly electrified by the charging roller 2.

The resulting latent image is developed as a toner image by a developing device 11. The resulting toner image is transferred with a transfer roller 12 to a transfer material 14 fed from a paper feeding device, although not shown in the drawing.

The transfer roller 12 is another example of the charging device manufactured using the charging member according to the present invention. That is, the transfer roller 12 transfers the toner image formed on the photosensitive member 1 to the transfer material 14 being electrified, by charging with the polarity opposite to that of the toner from reverse side of the transfer material 14.

The transfer material 14, the toner image being transferred thereto, is separated from the surface of the photosensitive layer 1a, is fed to an image fixing device, although not shown in the drawing, so as to be subjected to image fixing, and is output as the material on which the image has been formed. Furthermore, in the case in which the image is also formed on the reverse side, the transfer material 14 is fed to a resending device.

After completion of image transfer, the photosensitive layer 1a is subjected to removal of adhered pollutants such as toners remaining after transfer by a cleaning device 13 so as to have a cleaned face and to be repeatedly subjected to image formation.

The charging member may also be used in the forms of blade type, block type, and belt type other than the roller type charging device as explained above.

The roller type charging device may be rotated depending on the image-holding member 1, the surface thereof being moved, or may not be rotated. In addition, the roller type charging device may be independently rotated at a predetermined peripheral velocity in the direction same with or opposite to the direction of movement of the surface of the image-holding member 1.

Among the aforementioned constituents, for example, the image-holding member, the charging device, and the cleaning device, a plurality of constituents may be integrally assembled as a process cartridge mountable on and detachable from electrophotographic apparatuses such as copying machines and optical printers. For example, at least one selected from the group consisting of the charging device, the developing device, and the cleaning device and the image-holding body are integrally supported and assembled as the process cartridge mountable on and detachable from the main body of an apparatus using a guiding device, e.g., a rail in the main body of the electrophotographic apparatus.

In the case in which the electrophotographic apparatus is used as a printer of the copying machine, the optical image exposure is performed by the reflected light from an original document or transmitted light, or by scanning with the laser beam, driving the LED array, driving the liquid crystal shutter array, etc., in accordance with signals of the original document being red out and signalized.

As the conductive substrate layer 1b, metals, for example, aluminum, aluminum alloys, stainless steels, and nickel can be used. In addition, plastics and glass coated with aluminum, aluminum alloys, indium oxide-tin oxide to alloys, etc., by vacuum deposition can be used.

An undercoating layer having functions of a barrier and of adhering may be provided on the conductive substrate layer 1b.

The undercoating layer can be formed of, for example, casein, polyvinyl alcohol, nitrocellulose, ethylene-acrylic acid copolymer, amides, e.g., nylon 6, nylon 66, nylon 610, and nylon copolymer, polyurethane, gelatin, and aluminum oxide. The film thickness of the undercoating layer is 5 $\mu$m or less, preferably is 0.5 to 3 $\mu$m. The electrical resistance of the undercoating layer is preferably $1\times10^7$ $\Omega$ or more in order to exhibit functions thereof.

The photosensitive layer 1a can be formed by coating of an organic or an inorganic photoconductive material together with a binder resin as necessary, or can be formed by vapor deposition.

The photosensitive layer 1a preferably has a configuration of a laminated photosensitive layer composed of a charge generation layer and a charge transportation layer each having an independent function.

The charge generation layer can be formed of charge generation materials, for example, azo dyes, phthalocyanine pigments, and quinone pigments by vapor deposition or coating together with an appropriate binder resin, although the binder resin may not be used. The film thickness of the charge generation layer is 0.01 to 30 $\mu$m, preferably is 0.05 to 2 $\mu$m.

The charge transportation layer can be formed of charge transportation materials, for example, hydrazone compounds, styryl compounds, oxazole compounds, and triarylamine compounds, being dissolved into a binder resin having a property of forming a film. The film thickness of the charge transportation layer is 5 to 50 $\mu$m, preferably is 10 to 30 $\mu$m.

In order to prevent aging due to the ultraviolet, etc., and to improve abrasion resistance, a protection layer may be provided on the photosensitive layer 1a.

EXAMPLES

The present invention will be further explained below in detail using the examples.

Example 1

Figure 3:
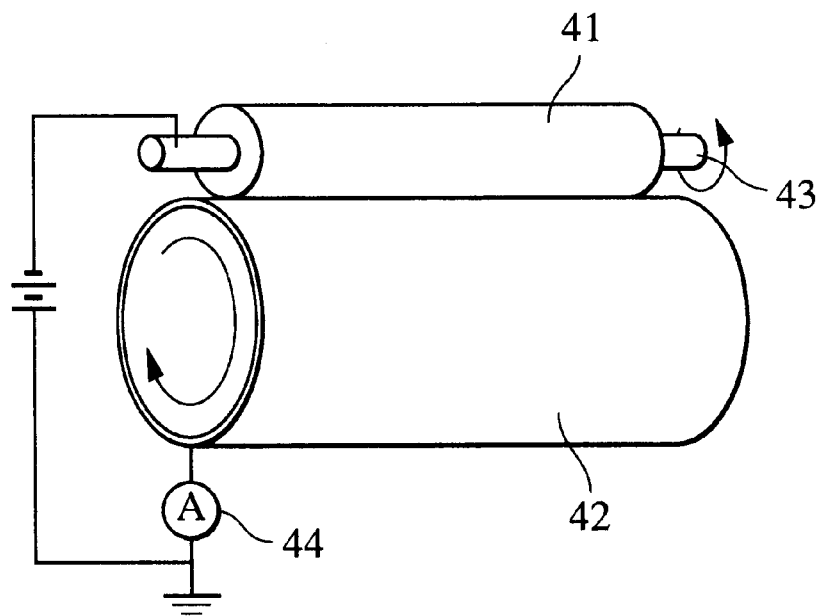
FIG. 3 is a constitutional view of a resistance measuring apparatus.

FIG. 3 shows the configuration of a manufactured transfer roller. Reference numeral 31 designates a core metal made of a conductive base material in the shape of a circular cylinder. Reference numeral 32 designates a semiconducting elastic layer made of the charging member according to the present invention.

The core metal 31 is manufactured from, for example, stainless steel, iron, and anticorrosive iron, the surface thereof being plated with nickel or nickel·chromium, each having a diameter of 6 mm.

A charging member 32 having a targeted electrical resistance of $1.0\times10^8$ $\Omega$ was manufactured according to the following steps. 45 parts by weight of nitrile rubber (trade name of DN233, nitrile content of 31.5%, manufactured by ZEON CORPORATION), 40 parts by weight of NBR (trade name of N240S, nitrile content of 26%, manufactured by JSR Corporation), 30 parts by weight of epichlorohydrin rubber (trade name of EPICHLOMER H, manufactured by DAISO CO., LTD.), 20 parts by weight of liquid nitrile rubber (trade name of 1312, manufactured by ZEON CORPORATION), 3 parts by weight of zinc oxide, 2 parts by weight of stearic acid, 40 parts by weight of calcium carbonate, and 3 parts by weight of hydrotalcite were mixed with a pressurized kneader, and 1 part by weight of 6-methylquinoxaline-2,3-dithiocarbonate, 0.5 parts by weight of sulfur, 2 parts by weight of DM, 1 part by weight of TRA, 0.2 parts by weight of DBU, 0.3 parts by weight of phenol resin, and 1 part by weight of MMBP were added thereto and were mixed with an open roll.

As DBU, commercially available high purity DBU was used. As the phenol resin, a novolac type phenol resin having a weight average molecular weight of 310 and an average introduction rate of hydroxymethyl groups of 0.1 was used.

In the aforementioned case, polar rubbers were 100 parts by weight composed of 30 parts by weight of rubber component in 45 parts by weight of nitrile rubber, 40 parts by weight of NBR, and 30 parts by weight of epichlorohydrin rubber.

The resulting mixture was molded on a tube by extrusion molding with no sticking and with good processability of extruding. This tube was subjected to the first vulcanization with a vapor at 160° C. for 30 minutes, and thereafter, was subjected to the second vulcanization with an electric furnace at 160° C. for 30 minutes so as to produce a vulcanized tube. The core metal 31 coated with an adhesive was put into the resulting tube with pressure, and the adhesive was cured. Then, the surface of the charging member was polished so as to produce a transfer roller of 16 mm in diameter.

The electrical resistance of the resulting transfer roller 41 was measured using the measuring apparatus as shown in FIG. 3. The transfer roller 41 was contacted with an aluminum drum 42 by a load of 5N being applied to the both ends of the transfer roller 41, and the measurement was made with an ammeter 44 while the aluminum drum 42 was rotated. As a result, after being stood for 24 hours in the environment of N/N (23° C., 50% R.H.), the electrical resistance was $1.0 \times 10^8$ Ω when direct current of 2 kV was applied between the core metal 43 and the aluminum drum 42. This value was the same as the targeted value of $1.0 \times 10^8$ Ω, although experimental errors might be taken into account. Therefore it was clear that the electrical resistance of the transfer roller 41 could be controlled with ease.

Furthermore, since the ratio of the maximum value to the minimum value (maximum value/minimum value) of the electrical resistances during one turn of the transfer roller 41 was 1.1 or less, it was clear that the electrical resistances were uniform.

The Asker C hardness of the resulting transfer roller 41 was 63°. Herein, the Asker C hardness is a hardness measured with an Asker rubber hardness tester (manufactured by KOBUNSHI KEIKI CO., LTD.) in accordance with Asker C type, SRIS 0101 (the Standard by the Society of Rubber Industry, Japan).

Next, the transfer roller 41 was mounted on a high speed copying machine testing apparatus with a photosensitive drum of 30 mm in diameter, and copying test was made under conditions of a process speed of 200 mm/sec, the photosensitive drum of negatively charged OPC, a toner of positively charged, a voltage applied to the transfer roller (during transfer) of −3 kV, and a voltage applied to the transfer roller (during cleaning) of +1.5 kV.

Line images, solid black images, and half-tone images were evaluated with the aforementioned testing apparatus using dry paper in each of environments of L/L (15° C., 10% R.H.), N/N, and H/H (32.5° C., 80% R.H.). As a result, the produced images were excellent.

Furthermore, an endurance test of continuous 300,000 copies using dry paper in the environment of L/L and the evaluation of images were made. No faulty image was produced and excellent images were produced throughout the test. Fluctuations of the electrical resistance were small and no degradation, for example, the alteration in quality and the crack, was recognized.

The transfer roller 41 was stood for 2 weeks while being press-contacted with an organic photosensitive member at the total load of 10 N in the environment of 40° C. and 95% R.H. As a result, no fault, for example, the alteration in quality of the photosensitive member and the crack, was generated.

As is clear from above description, in the charging device manufactured using the charging member according to the present invention, the electrical resistance is controlled with ease, the electrical resistances are uniform, and the electrical resistance, chemical properties, mechanical properties, etc., are suppressed to change with time so as to exhibit superior durability.

Example 2

The transfer roller 41 was mounted on an ultraviolet irradiating apparatus, and the surface thereof was treated by the irradiation of UV with primary wavelengths of 185 nm and 245 nm at 40 mW/cm² for 4 minutes while the transfer roller 41 was rotated. The resulting transfer roller was stood for 1 month while being press-contacted with an organic photosensitive member at the total load of 10 N in the environment of 40° C. and 95% R.H. As a result, no adhesion with the photosensitive member was occurred, nor was other problem, for example, pollution of the photosensitive member, generated.

Example 3

A transfer roller having a targeted electrical resistance of $7.5 \times 10^7$ Ω was manufactured in a manner similar to that in the transfer roller 41 except that the charging member was made of 60 parts by weight of NBR (trade name of N230S, nitrile content of 35%, manufactured by JSR Corporation), 20 parts by weight of epichlorohydrin rubber (trade name of EPICHLOMER H, manufactured by DAISO CO., LTD.), 20 parts by weight of ethylene-propylene-diene rubber EPDM (trade name of EPT9070E, manufactured by Mitsui Chemicals, Inc.), 30 parts by weight of liquid NBR (trade name of 1312, manufactured by ZEON CORPORATION), 0.2 parts by weight of DBU, 0.6 parts by weight of phenol resin, and 1 part by weight of MEBP.

As DBU, commercially available high purity DBU was used. As the phenol resin, a novolac type phenol resin having a weight average molecular weight of 310 and an average introduction rate of hydroxymethyl groups of 0.1 was used.

Polar rubbers were 80 parts by weight composed of 60 parts by weight of NBR and 20 parts by weight of epichlorohydrin rubber.

The electrical resistance of the produced transfer roller was $7.5 \times 10^7$ Ω when direct current of 2 kV was applied after being stood for 24 hours in the environment of N/N. The ratio of the maximum value to the minimum value (maximum value/minimum value) of the electrical resistances during one turn of the transfer roller was 1.1 or less, and these electrical resistances were hardly changed after an endurance test of 100,000 copies. The Asker C hardness was 64°.

As is clear from above description, in the charging device manufactured using the charging member according to the present invention, the electrical resistance is controlled with ease, the electrical resistances are uniform, and superior durability is exhibited.

Example 4

A transfer roller having a targeted electrical resistance of $1.1 \times 10^8$ Ω was manufactured in a manner similar to that in the transfer roller 41 except that the charging member was made of 30 parts by weight of NBR (trade name of N230S, nitrile content of 35%, manufactured by JSR Corporation), 45 parts by weight of nitrile rubber (trade name of DN223, nitrile content of 33.5%, manufactured by ZEON CORPORATION), 20 parts by weight of epichlorohydrin rubber (EPICHLOMER H), 20 parts by weight of butadiene rubber BR (trade name of BR-01, manufactured by JSR Corporation), 20 parts by weight of liquid NBR, 1 part by weight of MEBP, and 1 part by weight of BBMP.

In the aforementioned case, polar rubbers were 80 parts by weight composed of 30 parts by weight of NBR, 30 parts by weight of rubber component in 45 parts by weight of nitrile rubber, and 20 parts by weight of epichlorohydrin rubber.

The electrical resistance of the produced transfer roller was $1.1 \times 10^8$ Ω when direct current of 2 kV was applied after being stood for 24 hours in the environment of N/N. The ratio of the maximum value to the minimum value (maximum value/minimum value) of the electrical resistances during one turn of the transfer roller was 1.1 or less, and these electrical resistances were hardly changed after an endurance test of 100,000 copies. The Asker C hardness was 62°.

As is clear from above description, in the charging device manufactured using the charging member according to the present invention, the electrical resistance is controlled with ease, the electrical resistances are uniform, and superior durability is exhibited.

Comparative Example 1

A transfer roller having a targeted electrical resistance of $1.0 \times 10^8$ Ω was manufactured in a manner similar to that in the transfer roller 41 except that regarding the charging member, 70 parts by weight of NBR (trade name of N220S, nitrile content of 41%, manufactured by JSR Corporation), 30 parts by weight of BR (BR-01), 20 parts by weight of liquid nitrile rubber (trade name of 1312), 3 parts by weight of zinc oxide, 2 parts by weight of stearic acid, 40 parts by weight of calcium carbonate were mixed with a pressurized kneader, and 0.5 parts by weight of sulfur, 1 part by weight of M, and 2 parts by weight of DM were added thereto.

The electrical resistance of the produced transfer roller was $1.5 \times 10^8$ Ω when direct current of 2 kV was applied after being stood for 24 hours in the environment of N/N. The ratio of the maximum value to the minimum value (maximum value/minimum value) of the electrical resistances during one turn of the transfer roller was 1.4. The Asker C hardness was 66°.

Furthermore, an endurance test of continuous 300,000 copies using dry paper in the environment of L/L and the evaluation of images were made. As a result, faulty images were produced accompanying increase in the electrical resistance of the transfer roller.

Comparative Example 2

A transfer roller having a targeted electrical resistance of $1.0 \times 10^7$ Ω was manufactured in a manner similar to that in the transfer roller 41 except that regarding the charging member, 50 parts by weight of epichlorohydrin rubber (trade name of EPICHLOMER CG, manufactured by DAISO CO., LTD.), 50 parts by weight of BR (trade name of BR-01), 20 parts by weight of polyester-based plasticizer, 3 parts by weight of zinc oxide, 2 parts by weight of stearic acid, 40 parts by weight of calcium carbonate, and 3 parts by weight of hydrotalcite were mixed with a pressurized kneader, and 0.5 parts by weight of sulfur, 2 parts by weight of M, and 2 parts by weight of TRA were added thereto and were mixed with a open roll.

The electrical resistance of the produced transfer roller was $6.5 \times 10^7$ Ω when direct current of 2 kV was applied after being stood for 24 hours in the environment of N/N. The ratio of the maximum value to the minimum value (maximum value/minimum value) of the electrical resistances during one turn of the transfer roller was 1.5. The Asker C hardness was 62°.

Furthermore, an endurance test of continuous 300,000 copies using dry paper in the environment of L/L and the evaluation of images were made. As a result, faulty images were produced accompanying increase in the electrical resistance of the transfer roller.

The produced transfer roller was stood for 2 weeks while being press-contacted with an organic photosensitive member at the total load of 10 N in the environment of 40° C. and 95% R.H. As a result, adhesion with the photosensitive member was occurred and change of color was observed at the contacted place. The evaluation of image using this photosensitive member was made with the result that faulty images were produced.

The produced transfer roller was mounted on an ultraviolet irradiating apparatus, and the surface thereof was treated by the irradiation of UV with primary wavelengths of 185 nm and 245 nm at 40 mw/cm$^2$ for 4 minutes while the transfer roller was rotated. The resulting transfer roller was stood for 2 weeks while being press-contacted with an organic photosensitive member at the total load of 10 N in the environment of 40° C. and 95% R.H. As a result, faulty images were produced due to transported materials on the surface of the roller.

Comparative Example 3

As raw materials for urethane, 104.5 parts by weight of polyether polyol (trade name of H9246, with no catalyst, manufactured by Daiichi Kogyo Shiyaku K.K.), 37.1 parts by weight of isocyanate (trade name of H9241 index 100, manufactured by Daiichi Kogyo Shiyaku K.K.), 2 parts by weight of carbon black, 0.6 parts by weight of DBU, and 1.2 parts by weight of phenol resin were mixed. The resulting mixture was injected into a vertically installed cylindrical mold of 16 mm in inner diameter and 220 mm in length provided with a core metal of 6 mm in diameter in the central part thereof from the lower part of the cylindrical mold, and thereafter, a transfer roller was produced by heating at 70° C. for 15 minutes. In the produced transfer roller, unevenness in hardness developed along the direction of the axis of the roller. The maximum degree of unevenness was 7 degrees relative to the average Asker C hardness of 55°. The electrical resistance of the produced transfer roller was 1.8E+8 Ω on average when direct current of 2 kV was applied after being stood for 24 hours in the environment of N/N. The evaluation of images was made using this roller in the environment of L/L in a manner similar to that in Example 1. As a result, unevenness in image concentration was generated due to unevenness in resistance. It is believed that the unevenness in resistance is caused by the difference between the contact nip widths of both sides. An endurance test of continuous 100,000 copies was made with the result that faulty images were produced due to the photosensitive member being shaved at the end portion with large contacting pressure.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A charging member primarily comprising 100 parts by weight of at least one kind of polar rubber including at least a nitrile rubber, further comprising at least:

0.01 parts by weight or more and 5 parts by weight or less of diazabicycloamine compound; and 0.01 parts by weight or more and 10 parts by weight or less of weakly acidic compound.

2. A charging member according to claim 1, wherein said diazabicycloamine compound is at least one kind selected from the group consisting of 1,8-diazabicyclo[5.4.0]-7-undecene (DBU), 1,5-diazabicyclo[4.3.0]-5-nonene (DBN), and 1,4-diazabicyclo[2.2.2]octane (DABCO).

3. A charging member according to claim 1, wherein said weakly acidic compound is a phenol resin.

4. A charging member according to claim 1, comprising at least two kinds of polar rubbers having different speeds of vulcanization including a nitrile rubber and an epichlorohydrin rubber.

5. A charging member according to one of claims 1 to 4, further comprising 0.01 parts by weight or more and 5 parts by weight or less of bisphenol-based rubber antioxidant relative to 100 parts by weight of said polar rubber.

6. A charging member according to one of claims 1 to 4, further comprising 1 parts by weight or more and 100 parts by weight or less of at least one kind of nonpolar rubber relative to 100 parts by weight of said polar rubber.

7. A charging member according to one of claims 1 to 4, wherein the surface of said charging member is subjected to an ultraviolet treatment.

8. An electrophotographic apparatus, comprising a charging member according to one of claims 1 to 4.

9. A process cartridge, wherein at least one selected from the group consisting of a charging member, a developing device, and a cleaning device and an image-holding member are integrally assembled as a cartridge mountable on and detachable from the main body of an apparatus, said charging member being an charging member according to one of claims 1 to 4.

* * * * *